W. W. ALDEN.
Ornamental Chain.
No. 214,075.  Patented April 8, 1879.
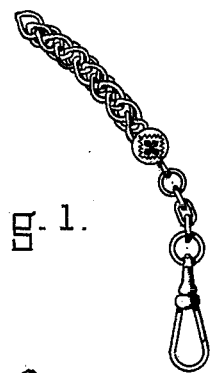
Fig. 1.
  
Fig. 3.  Fig. 4.
Fig. 2.
WITNESSES  INVENTOR
William W. Alden
By his Att'ys.

UNITED STATES PATENT OFFICE.

WILLIAM W. ALDEN, OF SPRINGFIELD, ASSIGNOR TO SHORT, NERNEY & CO., OF ATTLEBOROUGH, MASSACHUSETTS.

IMPROVEMENT IN ORNAMENTAL CHAINS.

Specification forming part of Letters Patent No. 214,075, dated April 8, 1879; application filed December 11, 1878.

*To all whom it may concern:*

Be it known that I, WILLIAM W. ALDEN, of Springfield, in the county of Hampden and State of Massachusetts, have invented a new and useful Improvement in Ornamental Chains, of which the following is a specification.

My improvement consists in the hereinafter-described whip-lash chain, constructed of reverse links sprung into place and held therein without the aid of solder.

In the accompanying drawings, Figure 1 is a view of a portion of a chain embodying my improvement. Fig. 2 is an enlarged view of a few links. Figs. 3 and 4 are, respectively, right and left reverse links.

The nature of the arrangement of the links is clearly shown in Fig. 2, where each right link, $a$, catches in the second link above it, (which is also a right link,) embracing also an intermediate left link, $b$, which in its turn catches in the second link above it (a left link) and embraces an intermediate right link.

The nature of the whip-lash chain is such that the links, which are shaped beforehand, may be sprung into place and held therein without the aid of solder, and the open ends of the links are not noticed, being practically concealed by the links around them.

I am aware that the "figure-of-eight link," so called, is not new in this invention, and therefore I of course make no claim to it, by itself considered.

Having thus fully described my improvement, I do not claim that it is new in a chain to make an open unsoldered link; but

What I claim, and desire to secure by Letters Patent, is—

The hereinbefore-described ornamental chain, consisting of the right-hand links, $a$, and left-hand links, $b$, constructed and arranged, substantially in the manner shown and described, into whip-lash style or shape, for the purpose set forth.

WILLIAM W. ALDEN.

Witnesses:
 HENRY W. WILLIAMS,
 B. W. WILLIAMS.